Nov. 29, 1949     O. J. LEONE     2,489,455
DETERMINATION AND CONTROL OF MOISTURE
CONTENT IN GASEOUS MEDIA

Filed Dec. 11, 1944     2 Sheets-Sheet 2

INVENTOR.
Otto J. Leone
BY E. C. Sanborn
Attorney

Patented Nov. 29, 1949

2,489,455

UNITED STATES PATENT OFFICE 2,489,455

DETERMINATION AND CONTROL OF MOISTURE CONTENT IN GASEOUS MEDIA

Otto J. Leone, West Newton, Pa., assignor to The Bristol Company, Waterbury, Conn., a corporation of Connecticut Application December 11, 1944, Serial No. 567,770

9 Claims. (Cl. 236—44)

This invention relates to the determination and control of moisture content in a gaseous medium, and more especially to measurement and regulation of the absolute humidity value of a confined stream of air, such as the blast to a blast furnace, cupola, or other apparatus where there takes place a reaction involving a gaseous agent having a predetermined moisture content per unit quantity.

When atmospheric air is supplied to a blast furnace, its moisture content may vary through a wide range, tests being on record to show a monthly range of as much as from .65 to 3.55 grains per cubic foot, with occasional variations of as much as 2 grains per cubic foot in a 24 hour period. Though the relative economic merit of operating a furnace on a basis of moisture control, as against "dry blast" or low humidity, has been the basis of controversy, recent experience has shown that a smoother operation and a better control of impurities can be obtained where the moisture content of the blast is regulated within predetermined limits than where every effort is exerted toward reducing the humidity to the lowest possible value. In order to effect automatic regulation of any variable, it is essential that means be provided for continuously performing a measurement upon the magnitude of that variable. In the control of moisture content in the blast to a furnace or cupola, it is essential that regulation be performed on a basis of absolute, rather than relative humidity. The latter would have no significance in meeting the problem in hand. Humidity meters utilizing the hygroscopic principle are suited only to the determination of relative humidity; and the measurement of absolute humidity by other methods ordinarily requires compensation for independent variables such as temperature and barometric pressure, thus introducing such complications as in the past have led to the avoidance of attempts to perform such a measurement in any instances where a relative humidity measurement can be utilized.

It is an object of the present invention to provide means for simultaneously measuring and controlling the moisture content of a confined stream of air or similar gaseous medium.

In carrying out the purposes of the invention it is proposed to provide a control system in which there shall be continuously diverted from the main stream of air or other gaseous medium, whose moisture content is required to be determined and regulated, a representative sample, regulating all but one of the variable characteristics of the diverted sample to predetermined constant values, and upon the basis of a measurement performed on the remaining characteristic to control the moisture content of the main stream. In the determination of absolute humidity of a gaseous medium by the measurement of temperature, cognizance must be taken of three magnitudes, viz. wet-bulb temperature, dry-bulb temperature, and pressure; and, by maintaining any two of these at constant predetermined values, the third may be taken as a measure of absolute humidity. In the invention as hereinafter disclosed there are shown three alternative methods of effecting the desired result, these involving (1) maintenance of constant pressure and dry-bulb temperature, and control of moisture content on a basis of wet-bulb temperature, (2) maintenance of constant pressure and wet-bulb temperature and control of moisture content on a basis of dry-bulb temperature, and (3) maintenance of constant pressure and dry-bulb temperature, and control of moisture content on a basis of wet-bulb depression; or difference between dry and wet bulb temperature.

Other features of the invention will be hereinafter described and claimed.

Figure 1:
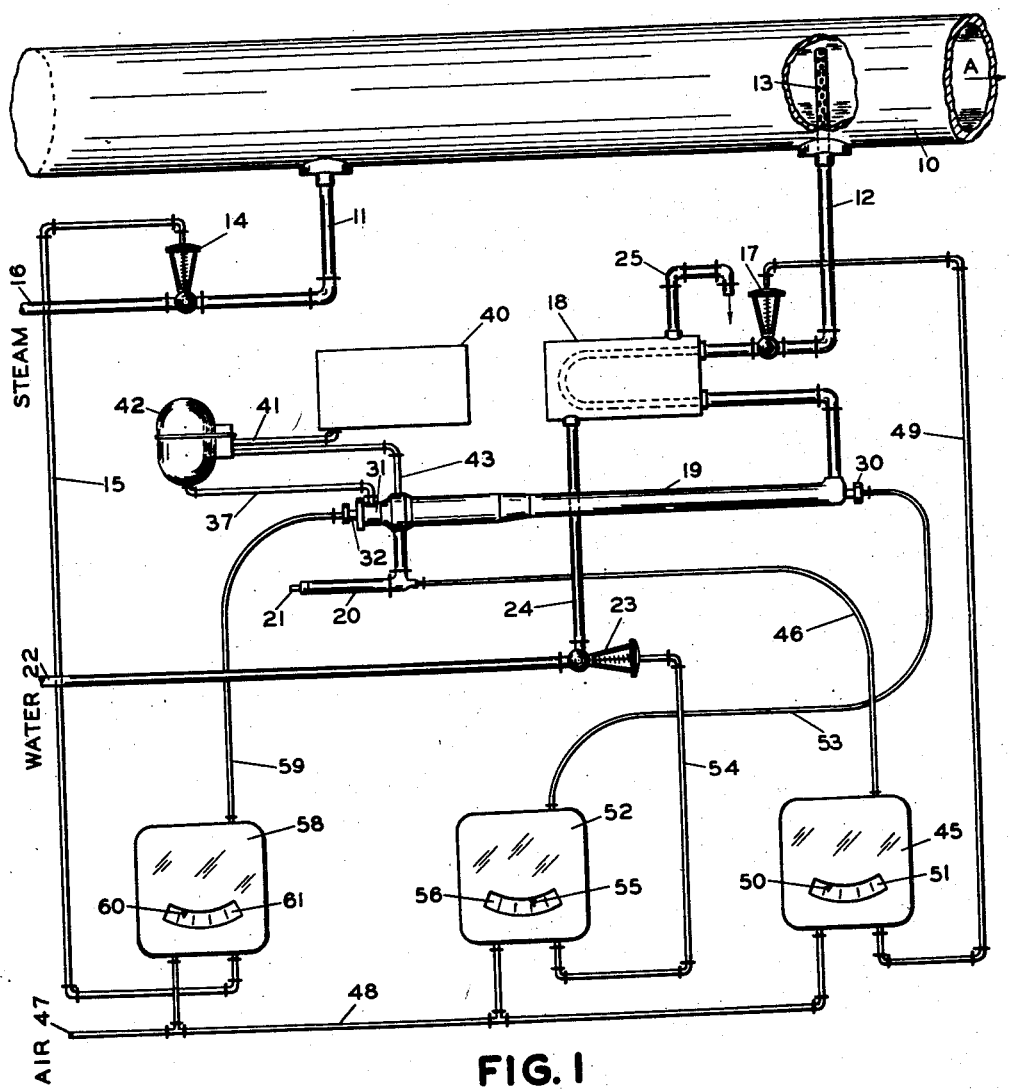
Fig. 1 is a diagrammatic representation of the invention as applied to the measurement and control of moisture content in the supply of air to a blast furnace on a basis of wet-bulb temperature.

Referring now to the drawings:

The numeral 10 designates a conduit, such as the blast main to a furnace, through which is forced in the direction indicated by the arrow A a stream of air at a pressure and a temperature materially above those of the surrounding atmosphere. An object of the invention is to maintain at a constant predetermined value, by means of a regulated volume of steam or other moistening agent admitted to the conduit 10 through an inlet pipe 11, the moisture content, or absolute humidity of said air, as determined from a sample continuously withdrawn from said conduit through a sampling pipe 12. The latter is positioned on the "downstream" side of said inlet pipe, at a distance sufficient to assure a thorough admixture of the moistening agent with the air stream, and terminates within said conduit in a perpendicularly disposed extended perforated portion 13, whereby to assure that the sample withdrawn through the pipe 12 shall be representative of the mean quality of the air across the section of the conduit. Connected in the inlet pipe 11 is a pneumatically actuated valve 14, the degree of whose opening may be adjusted by means of air pressure supplied through a tubular connection 15, thereby regulating in response to the value of said pressure the rate of admission of steam from a source 16 through inlet pipe 11 to the conduit 10.

The sampling pipe 12 passes through a pneumatically actuated valve 17 to a heat-exchanger 18, and thence to a fixture 19 including temperature-sensitive elements presently to be described. From the fixture 19 there is provided an air-escape to the atmosphere, comprising a conduit section 20 terminating in a fixed orifice 21, whereby to provide in the fixture 19 a back-pressure jointly subject to the dimensions of said orifice and to the degree of opening of the valve 17. Since the said valve is under continuous regulation to produce a constant pressure in the fixture 19, there will be a substantially constant escape of air through the orifice 21. A supply of cooling water at a temperature materially lower than that of the air in the main 10, is derived from a source 22 through a pneumatically actuated regulating valve 23 and a conduit 24 connected to the inlet of the heat exchanger 18, while a further conduit 25 connected to the outlet of the exchanger provides for escape of said cooling water to a sump or drain not shown in the drawings.

The fixture 19 comprises an extended tubular structure through which may pass in a longitudinal sense, and with no appreciable temperature or pressure gradient, the stream of gas diverted from the conduit 10 by means of the sampling pipe 12. At the inlet end of said structure is located a temperature-sensitive bulb 30. The outlet end of the fixture is preferably of enlarged section and encloses a fitting 31 carrying a temperature-sensitive bulb 32 provided with means, as indicated in Fig. 2, whereby its exposed surface is continually maintained in a moist condition whereby said surface will attain a "wet-bulb" temperature, as commonly utilized in conventional measurements of relative humidity.

Figure 2:
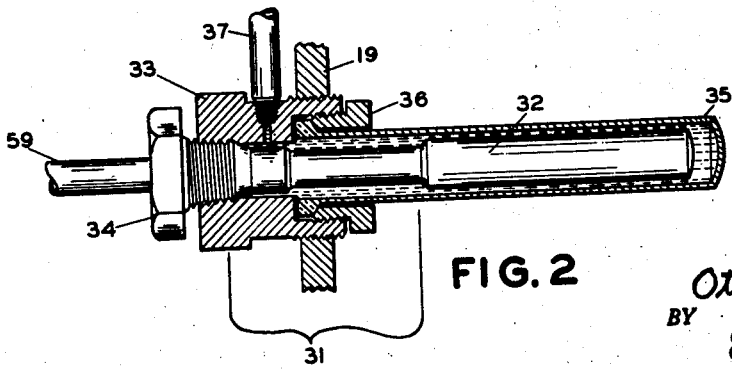
Fig. 2 is a side elevation, partly in section, and on an enlarged scale with respect to Fig. 1, of a "wet bulb" suited to the purposes of the invention.

Referring to Fig. 2, the fitting 31 will be seen to consist of a body portion 33 externally threaded for insertion into the fixture 19. The temperature-sensitive bulb 32 is provided with an externally threaded portion 34 integral therewith, and adapted to engage the internally threaded portion of the outer end of the fitting 31, whereby said bulb, after insertion through said fitting, may be tightly secured thereto. A porous enclosing well or sleeve 35 formed of Alundum or unglazed porcelain or the like, and adapted to enclose the bulb 32, is secured to the inner part of the fitting 31 by means of a clamping nut or gland 36. A threaded lateral opening in the fitting 31 provides for connection of a small tube or pipe 37, whereby water may be admitted to the interior of the sleeve 35 to fill the space between said sleeve and the bulb 32, and, seeping through the porous structure of the sleeve, to provide a permanently moist exterior surface upon the same.

A supply of water for the wet bulb element is provided by means of a storage tank 40 elevated above the fixture 19 and having an outlet pipe 41 adapted to feed water from said tank to a pressure tight constant-level reservoir 42 having an outlet to which is connected the pipe 37. Moreover, since it is desirable to maintain the same pressure within the reservoir as prevails in the fixture 19, an equalizing connection 43 may be had therebetween.

As an alternative to the porous sleeve surrounding a temperature sensitive bulb, "wet-bulb" conditions may be maintained by the use of a fibrous wick dipping in a reservoir, such being well known in the art of humidity determination, and for which no novelty is here claimed. A pressure-responsive controlling instrument 45, which may expediently be of the type fully disclosed in U. S. Letters Patent No. 1,880,247, granted to H. L. Griggs et al., October 4, 1932, and operating upon a well-known principle more fully shown in connection with Fig. 4 of the present application, is provided with a tubular connection 46 to the conduit section 20, and is adapted to receive air under pressure from a source 47 through a conduit 48 and to deliver said air under controlled pressure through conduit 49 to the pneumatically actuated valve 17, whereby to regulate to a constant value, predetermined by the setting of said instrument, the pressure existing within the fixture 19. A pointer 50 attached to the mechanism of the instrument 45, and cooperating with a graduated scale 51, provides at all times a measure of the pressure existing with the fixture 19.

Regulation of the temperature of air admitted to the fixture 19 is effected by means of a pneumatic controller 52 similar in all respects to the instrument 45, and having its sensitive element connected by a capillary tube 53 to the bulb 30. The controller 52 is adapted to receive air from the conduit 48 and to deliver it under controlled pressure through a tubular connection 54 to the pneumatically actuated valve 23, and thus to regulate the flow of cooling water to the heat exchanger 18, whereby the temperature of the air in the fixture 19 will be maintained at a predetermined constant value established by the setting of the control elements in the instrument 52. An index or pointer 55, cooperating with a graduated scale 56 provides at all times a measure of the "dry-bulb" temperature within the fixture 19.

A pneumatic controller 58, similar in all respects to the instrument 52 has its sensitive element connected to the bulb 32 by means of a capillary tube 59, and is adapted to receive air from the conduit 48 and to deliver it under controlled pressure to the tubular connection 15 to the valve 14, and thus to regulate the admission of steam from the source 16 through the pipe 11 to the blast main 10. An index or pointer 60, cooperating with a graduated scale 61 provides at all times a measure of the "wet-bulb" temperature within the fixture 19.

It is obvious that without departing from the spirit of the invention, any, or all, of the controlling instruments 45, 52 and 58, may be equipped with a time-driven chart and a recording pen or stylus, as shown in the previously mentioned patent to Griggs et al., whereby there will be provided continuous graphic records of the several variable magnitudes involved.

The operation of the apparatus is as follows: Since the stream of air within the blast main 10 is at a pressure above that of the surrounding atmosphere, there will be a tendency for a portion of said air to enter the perforated tubular extension 13, and to be diverted through the sampling pipe 12, the valve 17, the heat exchanger 18, the fixture 19, and the conduit portion 20, finally escaping through the fixed orifice 21. The flow of said diverted portion of the air stream being controlled by the valve 17, subject to the instrument 45, which, in turn, is responsive to the pressure within the conduit portion 20, the pressure of air within the fixture 19 may, as hereinbefore set forth, be maintained at a predetermined fixed value; and a measure of said value will be provided by the reading of the pointer 50 with respect to the scale 51.

Since the diverted air is normally at a temperature above atmospheric, the effect of its passage through the heat exchanger 18 in thermal association with the cooling water from the source 22 will be to lower its temperature to a value more nearly approaching that of the surrounding air. The bulb 30, exposed to the stream of air entering the fixture 19 after it has left the heat exchanger 18, will provide a measure of the "dry-bulb" temperature within said fixture; and the control instrument 52, acting upon the valve 23, will regulate the flow of cooling water to the heat exchanger 18, whereby said dry-bulb temperature will be maintained at a constant predetermined value. In order that the measure of temperature obtained by the bulb 30 is a true "dry-bulb" temperature, the apparatus must be operated under such conditions that the temperature of the air entering the fixture 19 at no time falls to the dew-point corresponding to the moisture content.

The temperature of the bulb 32 will be dependent not only upon the actual temperature of the air within the fixture 19, but also upon the degree of moisture carried by said air. Since the rate of escape of air through the orifice 21 is substantially constant, the rate of flow over the bulbs 30 and 32 will be subject to negligible variation, so that any error of the wet bulb reading from the temperature of adiabatic saturation, due to convection (which is a function of air velocity) should then be constant. The "wet-bulb" temperature, as measured by the bulb 32, taken in combination with the "dry-bulb" temperature as measured by the bulb 30, and with the pressure of the medium upon which these measurements are made (assuming, of course, that the pressures are the same at both said bulbs) will provide a measure of the magnitude commonly known as "relative humidity"; and, with the pressure and the "dry-bulb" temperature each regulated to a constant value, as hereinbefore set forth, all variables disappear from the humidity equation, excepting that representing the "web-bulb" temperature, whereupon the latter becomes a measure of the true moisture content or absolute humidity of the air within the fixture 19; and the only change which can take place in the temperature so measured will be that due to variation in the moisture content of the air diverted through the sampling pipe 12 from the main 10.

The control instrument 58 being responsive to temperature as measured by the bulb 32, and acting upon the valve 14 to regulate the admission of steam to the blast main, may thus be caused to act in a sense to maintain the temperature as measured by the bulb 32 at a predetermined constant value, and thereby correspondingly to control the moisture content or absolute humidity of the air stream within the blast main 10 to a corresponding value.

The scale 61 of the instrument 58 may be calibrated in terms of absolute humidity or grains of water per actual quantity of air, whereby will be obtained a continuous measure of said moisture content as regulated by the combined influences of the several controlling instruments.

Figure 3:
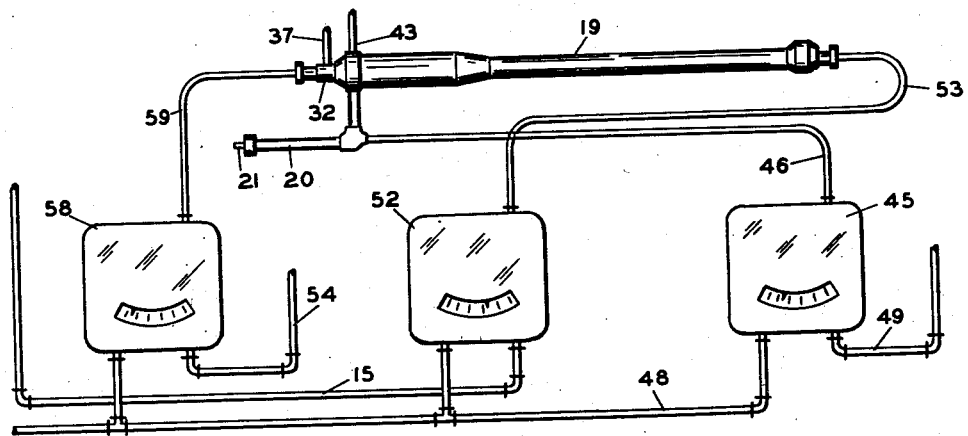
Figs. 3 and 4 are diagrammatic representations of adaptation of the principles of the invention to moisture content control on the bases of dry-bulb temperature, and wet-bulb temperature depression, respectively.

As hereinbefore pointed out, it is not essential that the final control of moisture content in the medium whose humidity is under regulation be effected on a basis of wet bulb temperature; and in Fig. 3 is shown a layout by which the same equipment as set forth in Fig. 1 may be utilized in control on a basis of dry bulb temperature, the sole difference from the arrangement shown in Fig. 1 lying in interchange of the conduits 15 and 54, whereby the former, regulating the operating pressure on the steam valve 14 is placed under control of the instrument 52, thereby rendering the admission of steam subject to dry bulb temperature, while the conduit 54, actuating the valve 23 is placed under control of the instrument 58 which is sensitive to wet-bulb temperature. Thus, as the controller 45 performs its original function of maintaining a constant pressure, the wet-bulb temperature will tend to be maintained constant by regulation of the temperature of the sample of air taken from the main conduit 10, while in its efforts to maintain the dry-bulb temperature constant the controller 52 will effect the desired regulation upon the moisture content of the air within the conduit 10.

Figure 4:
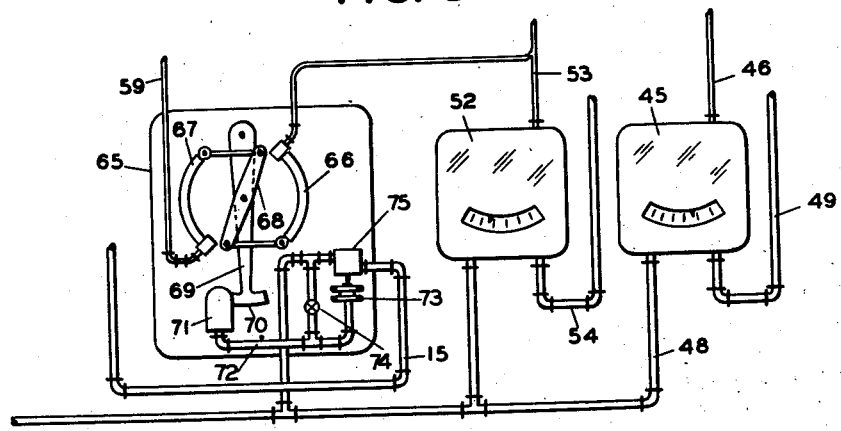

In Fig. 4 is shown an embodiment of the invention, wherein the desired control may be maintained on a basis of difference between the temperatures of the wet and dry bulbs. All the elements set forth in Fig. 1 are present and functioning in a manner identical thereto, with the exception that the controlling instrument 58 of Fig. 1 is replaced by a differential controller 65 responsive to said temperature difference instead of to a single temperature value. Mounted within the instrument 65 are two Bourdon tubes or similar pressure-responsive elements 66 and 67, having free extremities linked to opposite ends of an extended differential lever 68, intermediately pivoted on a deflectable arm 69 adapted for deflection through a limited angle about a pivotal mounting on the base of said instrument. The Bourdon tube 66 is connected to a branch of the capillary tube 53, and the Bourdon tube 67 to the capillary tube 59. The deflecting extremity of the arm 69 carries a thin metallic vane 70 adapted for movement in relation to orifices in a jet element 71 more or less to obstruct the escape therefrom of air under pressure. Connected to the jet element 71 is a conduit 72 communicating also with a bellows member 73, and receiving a supply of air from the conduit 48 through a constriction 74, whereby the pressure within the bellows 73 will vary with the position of the vane 70 as it may affect the back pressure of air admitted through the constriction 74 and escaping through the orifices in the jet element 71. A three-way valve 75 of the supply-and-waste type, having its stem actuated by deflection of the bellows 73, and receiving a supply of air from the conduit 48, has its outlet port connected to the conduit 15, whereby to actuate the valve 14 (shown in Fig. 1), and thereby to regulate the supply of steam to the conduit 10 and thus effect the desired control of moisture content of the air within said conduit. The principle of this vane, jet, and three-way valve arrangement is the full equivalent of that set forth in the hereinbefore mentioned Griggs et al patent, and is well known to those versed in the art. The differential action of the lever 68 upon the control member 70 in response to deflections of the Bourdon tubes 66 and 67 will produce a control function dependent upon the temperature gradient between the wet and the dry bulbs in the fixture 19, thereby effecting the desired form of regulation.

Figure 5:
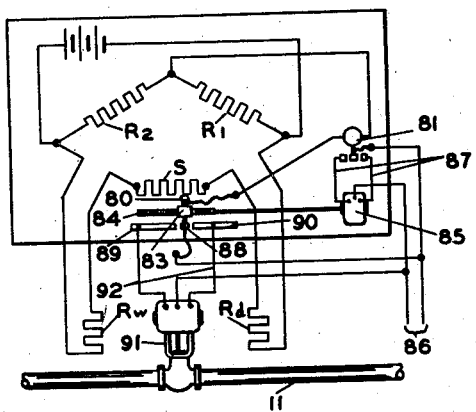
Fig. 5 is a diagrammatic representation of electrical measurement and control means operating on the basis of wet and dry bulb temperature difference, and adapted to the purposes of the invention.

While in the disclosure of the invention as thus far set forth the determination of dry and wet bulb temperatures has been indicated as performed by devices utilizing the expansive force of a confined fluid, it will be obvious that the purposes of the invention may be effected by apparatus utilizing other methods of temperature measurement, including those well-known electrical methods involving the principles of the thermocouple and of the resistance thermometer. In Fig. 5 is shown an application of the principle of the resistance thermometer to the determination of temperature difference between the dry and wet bulb, and the application of the measurement to regulation of an electrically operated valve. A bridge network is made up of two fixed and preferably equal resistors $R_1$ and $R_2$ and two temperature sensitive resistors $R_d$ and $R_w$ thermally associated with the dry and wet bulbs respectively of a system similar to that shown in Fig. 1. The resistors $R_d$ and $R_w$ are formed of a metal (such as copper or platinum) upon whose characteristic resistance temperature curve can be selected a portion following a substantially straight line law. Between the resistors $R_d$ and $R_w$ is interposed a slide wire S of fixed value, having a movable contact 80. Making a common point of one extremity of each of the resistors $R_1$ and $R_2$, and connecting the free ends to corresponding ends of the resistors $R_d$ and $R_w$, whose free extremities in turn are connected to the terminals of the resistor S, there is formed a closed network. Between the common point of resistors $R_1$—$R_2$ and movable contact 80 is connected a controlling galvanometer 81, and to the other opposite corners of the network, as represented by the above-mentioned interconnected "free" ends of the resistors $R_1$—$R_d$ and $R_2$—$R_w$, is connected a battery 82 or other suitable source of E. M. F.

By a suitable selection and proportioning of the resistance values of the several resistors, variable and fixed, making up the network, there is constituted a Wheatstone bridge; and the position of the movable contact 80 with respect to the slide-wire resistors 81 may be made a direct measure of the difference in resistance value of the resistors $R_d$ and $R_w$, and therefore of the temperature difference between the corresponding dry and wet bulbs.

The movable contact 80 is carried by a nut 83 and may thus be traversed along the slide wire S by means of a lead screw 84 driven by a reversible electric motor 85, actuated from a source of electric power supply 86 through a circuit 87 commanded by the contacts on the galvanometer 81, in a sense to maintain the bridge network in a condition of balance and thus, as hereinbefore set forth, to position the nut 83 and the contact 80 carried thereby at a translated position which will be a measure of the temperature depression of the wet bulb, or the temperature difference between the wet and dry bulbs.

Carried by the nut 83 is an electrical contact 88 adapted to engage either of two adjustable contacts 89—90, according to whether the nut 83 is toward the left or the right of the adjusted position of said last-named contacts. An electric-motor-operated valve 91 connected in the steam line 11 of Fig. 1, is adapted to be actuated from the electrical source 86 through a circuit 92 in a sense to open said valve when the contact 88 is in engagement with the contact 89 and to close said valve when in engagement with the contact 90. The admission of steam to the conduit 10, wherein the moisture content is under regulation, is thus controlled through electrical means in dependence upon the depression of the wet bulb temperature; and, with pressure and dry bulb temperature maintained constant as in the hereinbefore disclosed embodiments of the invention, the moisture content, or absolute humidity, of the air or gas within the conduit 10 will thus be controlled in the desired manner.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In apparatus for controlling the moisture content of a gaseous medium, means responsive to the pressure of a sample of said medium, means controlled by said responsive means for regulating said pressure to a predetermined constant value, means responsive to the dry bulb temperature of said sample, means responsive to the wet bulb temperature of said sample, means controlled by one of said temperature responsive means for regulating the corresponding one of said temperatures to a predetermined constant value, means for supplying to said medium moisture at a temperature not substantially lower than that of said medium, and means controlled by the means responsive to the other of said temperatures for regulating said moisture supplying means.

2. In apparatus for controlling the moisture content of a gaseous medium, means responsive to the pressure of a sample of said medium, means responsive to the dry bulb temperature of said sample, means responsive to the wet bulb temperature of said sample, means for regulating said pressure and one of said temperatures to predetermined constant values, means for supplying moisture to said medium, and means controlled by the joint influence of both said temperature-responsive means for regulating said moisture-supplying means.

3. In apparatus for controlling the moisture content of a gaseous medium, means responsive to the pressure of a sample of said medium, means responsive to the dry bulb temperature of said sample, means responsive to the wet bulb temperature of said sample, means for regulating said pressure and one of said temperatures to predetermined constant values, means for supplying moisture to said medium, and means controlled by the difference between the responses of both temperature-responsive means for regulating said moisture-supplying means.

4. Apparatus for controlling the moisture content of a gaseous medium, comprising means responsive to the pressure and the dry bulb temperature of a sample of said medium for regulating said pressure and temperature to predetermined values, means for supplying to said medium moisture at a temperature not substantially lower than that of said medium, and means controlled by the wet bulb temperature of the sample for regulating said moisture-supplying means.

5. In apparatus for controlling the moisture content of a gaseous medium, means responsive to the pressure of a sample of said medium, means responsive to the dry bulb temperature of said sample, means responsive to the wet bulb temperature of said sample, means for regulating said pressure and one of said temperatures to predetermined constant values, means for supplying moisture to said medium, and pneumatic means controlled by the difference between the responses of both said temperature-responsive means for regulating said moisture-supplying means.

6. In apparatus for controlling the moisture content of a gaseous medium, means responsive to the pressure of a sample of said medium, means responsive to the dry bulb temperature of said sample, means responsive to the wet bulb temperature of said sample, means for regulating said pressure and one of said temperatures to predetermined constant values, means for supplying moisture to said medium, and electrical means controlled by the difference between the responses of both said temperature responsive means for regulating said moisture-supplying means.

7. In apparatus for controlling the moisture content of a gaseous medium, means responsive to the pressure of a sample of said medium, means controlled by said responsive means for regulating said pressure to a predetermined constant value, means responsive to the dry bulb temperature of said sample, means responsive to the wet bulb temperature of said sample, means controlled by one of said temperature responsive means for regulating the corresponding one of said temperatures to a predetermined constant value, means for supplying steam to said medium, and electrical means controlled by the means responsive to the other of said temperatures for regulating said steam supplying means.

8. In apparatus for controlling the moisture content of a gaseous medium flowing through a conduit to a point of use, means responsive to the pressure of a sample of said medium, means responsive to the dry bulb temperature of said sample, means responsive to the wet bulb temperature of said sample, means controlled by the corresponding responsive means for regulating all but one of said temperature and pressure characteristics to constant predetermined values, means for admixing moisture with said flowing medium for passage with said medium to increase the humidity thereof at said point of use, and means controlled by said means responsive to said one characteristic for regulating said moisture-admixing means.

9. In apparatus for controlling the moisture content of a gaseous medium, means responsive to the pressure of a sample of said medium, means controlled by said responsive means for regulating said pressure to a predetermined constant value, means responsive to the dry bulb temperature of said sample, means responsive to the wet bulb temperature of said sample, means controlled by one of said temperature responsive means for regulating the corresponding one of said temperatures to a predetermined constant value, means for supplying steam to said medium, and pneumatic means controlled by the means responsive to the other of said temperatures for regulating said steam supplying means.

OTTO J. LEONE.

REFERENCES CITED

The following references are of record in the file of this patent:

UNITED STATES PATENTS

| Number | Name | Date |
|---|---|---|
| 1,167,740 | Carrier | Jan. 11, 1916 |
| 1,620,864 | Benesh | Mar. 15, 1927 |
| 1,758,494 | Behr | May 13, 1930 |
| 1,894,172 | Guthrie et al. | Jan. 10, 1933 |
| 1,915,971 | Beane et al. | June 27, 1933 |
| 1,942,934 | Reeve | Jan. 9, 1934 |